United States Patent [19]
Wand

[11] Patent Number: 5,265,719
[45] Date of Patent: Nov. 30, 1993

[54] PET LUGGAGE

[76] Inventor: Debra L. S. Wand, 4737 W. Wind Trail, Eagan, Minn. 55122

[21] Appl. No.: 979,893

[22] Filed: Nov. 23, 1992

[51] Int. Cl.⁵ .................... B65D 69/00; A45C 13/10
[52] U.S. Cl. .................... 206/223; 190/109; 190/111; 190/112; 190/125; 190/903
[58] Field of Search ............ 206/223; 190/109, 110, 190/111, 112, 125, 900, 901, 902, 903

[56] References Cited
U.S. PATENT DOCUMENTS

| | | |
|---|---|---|
| D. 221,339 | 8/1971 | Holycross . |
| 2,481,565 | 9/1949 | Boretz .................... 190/903 |
| 2,573,763 | 11/1951 | Graham .................. 190/111 |
| 3,232,397 | 2/1966 | McCoy ................... 190/110 |
| 3,870,132 | 3/1975 | Hanley ................... 190/109 |
| 4,024,880 | 5/1977 | Newton et al. . |
| 4,119,181 | 10/1978 | Jones . |
| 4,286,639 | 9/1981 | Murphy ................... 383/86 X |
| 4,350,274 | 9/1982 | Morgan . |
| 4,700,831 | 10/1987 | Kassai . |
| 4,773,515 | 9/1988 | Kotkins, Jr. ............. 190/903 |
| 4,899,887 | 2/1990 | Cachero .................. 190/109 |
| 4,909,553 | 3/1990 | Hantover . |
| 5,133,291 | 7/1992 | Justice . |
| 5,160,001 | 11/1992 | Marceau ................. 190/902 |

Primary Examiner—William I. Price
Attorney, Agent, or Firm—Robert C. Baker

[57] ABSTRACT

The pet luggage has an elongated main compartment with outside pockets at the ends of the main compartment, thereby making the luggage extremely long as compared to its width but more comfortably carried than shorter luggage of comparable volume. One outside pocket is for a leash, and the other is for fecal cleanup equipment. The main compartment is protectively closed by three separate fastening systems, two of which are zippers for lowering a front panel of the main compartment and on of which is Velcro-type for holding the top panel in covering position over the main compartment. Unfastening any one of the three separate fastening systems gives access to the main compartment. The top and bottom panels are stiffened to relatively reduce their pliability as compared to other panels. Padding of panels is employed to enhance comfort as the luggage bumps against a person carrying it. Within the main compartment are such items as a towel holder, pockets for grooming items, and a medicine container. Food and water containers are held in shaped holders. A flat interior pocket is included for storing sheet-like documentary-type items.

20 Claims, 2 Drawing Sheets

PET LUGGAGE

BACKGROUND OF THE INVENTION

This invention relates to pet luggage, and particularly to pet luggage for comfortably carrying equipment and supplies for a pet in a separated manner, allowing for selected access to some items and protected storage of other items.

Insofar as is known, while others have recognized and have proposed some possibilities for pet luggage, no one has heretofore provided pet luggage for conveniently and comfortably carrying all equipment and supplies necessary for a pet's health and welfare, as well as for environmental sanitation, in a manner such that those for environmental sanitation are readily accessible and entirely separate from all others. Further, insofar as is known, no one has ever suggested pet luggage having a multitude of features that save a pet owner from forgetting what should be packed for travel.

Still further, pet owners have special needs to satisfy during times such as preparing for a show (especially the grooming preparation), as well as during times such as preparing for cleaning up after hunting activity or the like. The invention provides luggage that can satisfy such needs and that can satisfy the concerns of the most dedicated and fastidious pet enthusiast.

SUMMARY OF THE INVENTION

The pet luggage of the invention is for comfortably carrying equipment and supplies for a pet in a separated manner allowing for selected access to some items (such as fecal clean-up equipment and also a leash) and protected storage of other items (such as grooming items and alimentary intake items). The luggage comprises an elongated main storage compartment having a substantially rectangular parallelepiped shape and at least one outside pocket attached to the main compartment and accessible independently thereof. The main compartment is defined by pliable bottom, top, front, back, and opposing end panels and by a length between end panels greater than two and one-fourth times the width between its front and back panels. The top panel is pivotably attached to the back panel and has a flap extension along its front edge. The front panel is pivotably attached to the bottom panel. The main compartment is further characterized by being protectively closed by three separate fastening systems. Two of the fastening systems consist essentially of zipper assemblies that unzip vertically to the bottom panel. One zipper assembly is between the front panel and one end panel, and the other zipper assembly is between the front panel and the other end panel. The zipper assemblies are designed to allow, on unzipping to the bottom panel, a pivotable drop of the front panel of the main compartment from a vertical orientation to a horizontal orientation substantially in the same plane as the bottom panel of the compartment. The third separate fastening system consists essentially of non-adhesive cooperatively interlocking structural surfaces formed of miniature elements that randomly interlock by mere perpendicular pressure of one structural surface against the other. One such structural surface is on the outer surface of the front panel proximate to the upper edge thereof; the other such structural surface is on the undersurface of the flap extension of the top panel. The third fastening system is unfastenable by forces applied perpendicular to the structural surfaces and is substantially incapable of being unfastened by forces applied parallel to the structural surfaces thereof. Any one of the three separate fastening systems is entirely unfastenable to provide access into the main compartment without unfastening either of the other two.

Many other features and benefits are part of the invention. Not the least of these is that one or both of the bottom and top panels of the luggage preferably comprises a stiffening sheet-like member which relatively reduces the pliability of the panel as compared to the pliability of those panels lacking such stiffening member. The preferred panels are padded. A towel holder is provided, as well as pockets for grooming items and for sheet-like documents. Containers for medicinal items as well as for food and water are among the items having special holders in the luggage.

Still other features and benefits and advantages of the invention will be evident as this description proceeds.

DESCRIPTION OF PREFERRED EMBODIMENTS(S)

Figure 1:
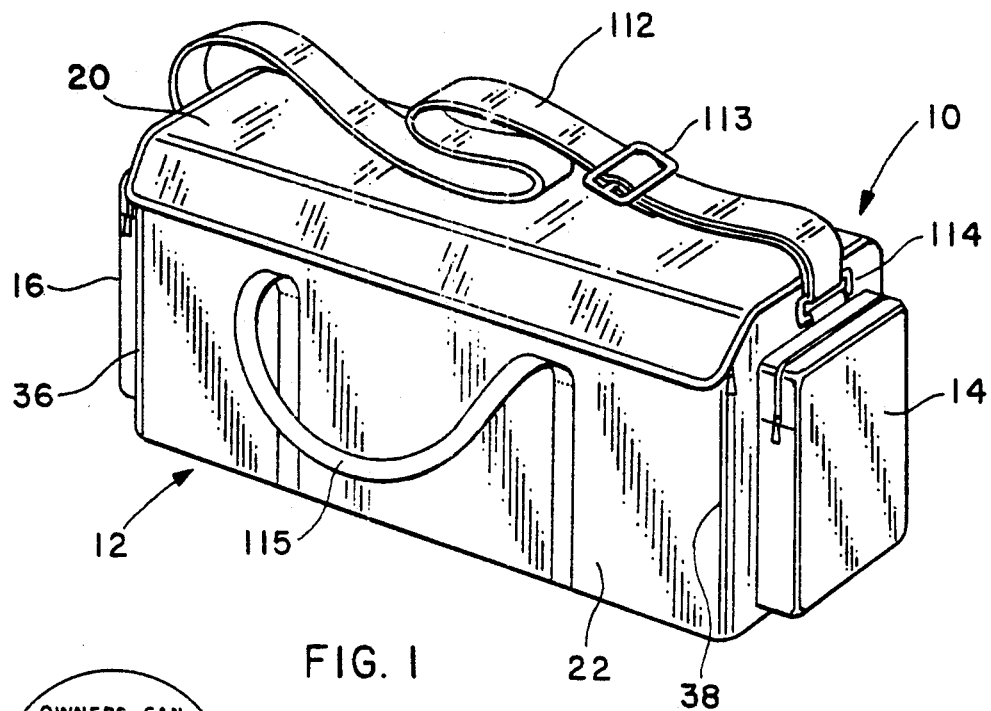
FIG. 1 is a schematic perspective view of the exterior of the pet luggage.
Figure 2:
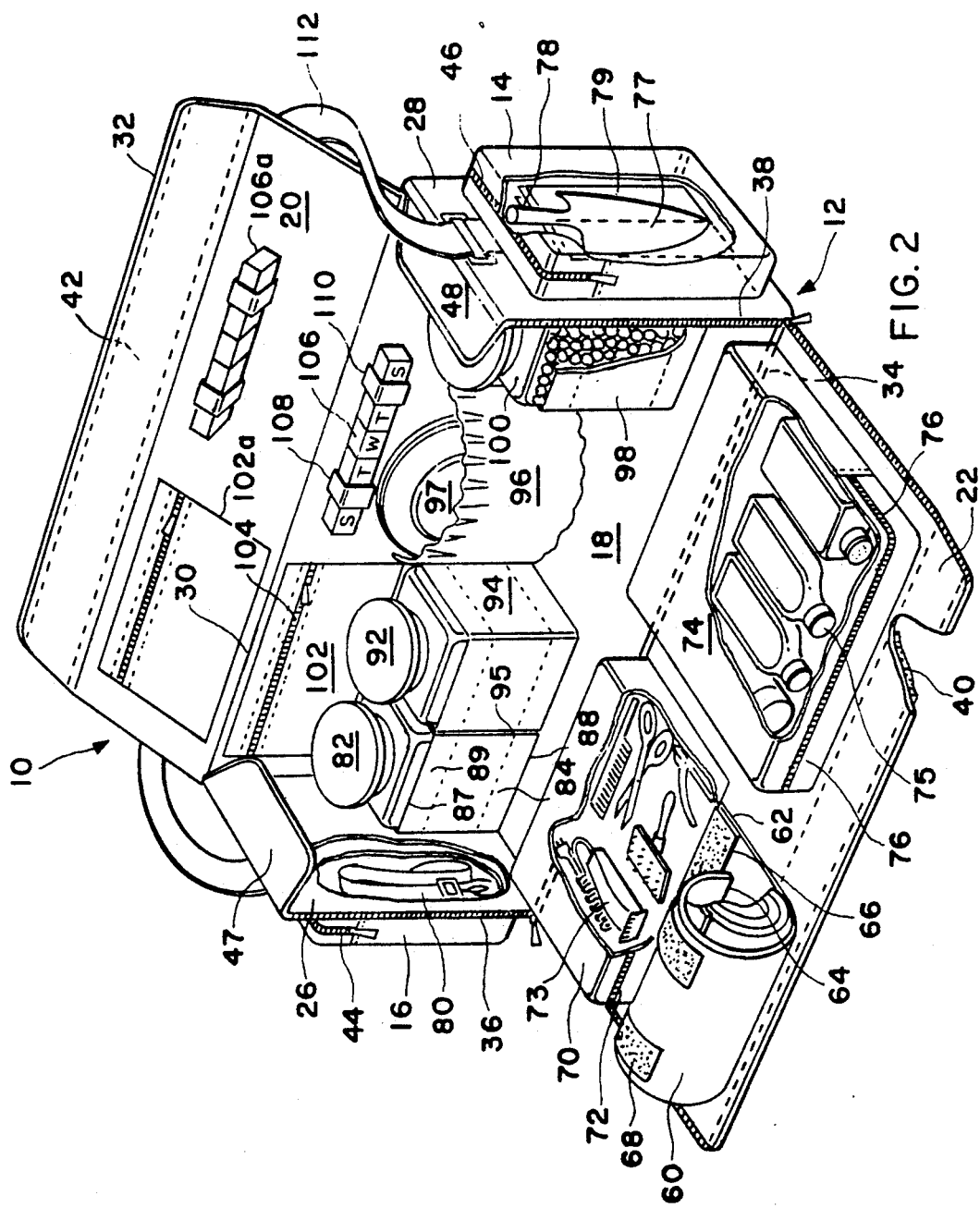
FIG. 2 is a schematic perspective view of the pet luggage with its main compartment in open condition (i.e., with the top panel lifted open and with the front panel pivotably dropped to extend in flat condition outwardly from the bottom panel of the luggage), with interior features of the luggage illustrated.

Referring to the drawing, particularly FIGS. 1 and 2, the pet luggage 10 comprises an elongated main storage compartment 12 having rectangular panels and thus a rectangular parallelepiped shape. It has at least one outside pocket 1 and preferably two outside pockets 14 and 16 attached to the main compartment and accessible independently of any access to the main compartment. The main compartment is defined by pliable bottom 18, top 20, front 22, back 24 and opposing end panels 26 and 28. All panels are pliable (i.e., conformable to distortion) to some degree, although some may be more pliable than others. Comfort in carrying the luggage is a significant consideration. Thus, the preferred panels of this new luggage are most preferably padded so as to give a soft comfortable feeling as the luggage bumps against a person carrying it.

Another significant feature is that end panels 26 and 28 are spaced apart or have a length between them greater than two and one-fourth times the width between the front 22 and back 24 panels. In fact, the length or space between the end panels preferably is at least two and one-half or even three times or more the width between the front and back panels. The reason for this is to place the main compartment 12 in suspended condition more directly below one's shoulder (when using shoulder strap 112) or more directly below a normal depending condition for a person's arms (when using hand straps 115 for carrying the luggage). Wide bulk between a front 22 and back 24 panel would preclude such comfort for shoulder or hand carrying. The relatively narrow width gained by elongating the length of the luggage (for equal compartment space enhances the comfort features for carrying the luggage as it bumps against the body of a person carrying the same. In this regard, the luggage is not equipped with rollers as is customary for airport luggage (although equipping this luggage with rollers might be a possible expedient).

The top panel 20 is pivotally attached (e.g., flexurally connected) to the back panel 24 along a line 30 such as formed by sewing. In fact, material of the back panel and top panel and even the flap extension 32 of the top panel may be continuous in nature, with a sewing line defining the connection between the top and back panel and between the top panel and its flap extension. The front panel 22 is similarly pivotably hinged along a line 34 of sewing to the bottom panel 18.

Three significant separate and discrete fastening systems provide protective closure for the main compartment. Two of the fastening systems are formed of slide fasteners commonly called zippers or zipper assemblies 36 and 38. Each of these unzip vertically to the bottom panel. One zipper assembly 36 is between one end edge of the front panel 22 and the adjacent end panel 26 of the main compartment at that end. The other zipper assembly 38 is between the other end edge of the front panel 22 and the adjacent end panel 28 of the main compartment at that end. These zipper assemblies 36 and 38, when unzipped to the bottom panel 18, allow the front panel 22 to pivotably drop from a vertical orientation to a horizontal orientation substantially in the same plane as the bottom panel 18.

The third discrete and separate fastening system is ideally not a slide fastener requiring slide movement of a fastening element along a line common to or parallel with the fastening system edges. This third system is entirely different in that it is one where the fastening is accomplished essentially by perpendicular pressure of one surface against another. This type of fastening system is characterized as consisting essentially of non-adhesive cooperatively interlocking structural surfaces formed of miniature (i.e., minute) elements that randomly interlook or intermesh by mere perpendicular pressure of one structural surface against the other. Well-known Velcro fasteners are illustrative of this type of fastener. They effectively form a strong fastening bond when opposing forces parallel to the mating surfaces are applied to the surfaces forming the bond, but a bond that is relatively easily separated when pulling forces are applied transversely or perpendicularly to the plane of the bond. The Velcro fastener consists essentially of hooking elements or miniature hooks for one surface and miniature loops for the other. Other fasteners of this type may comprise a surface of miniature toadstools with a surface of mating elements for randomly intermeshing with the pattern of toadstools. Of course, the ideal fasteners are of the Velcro type, and it is desirable to employ the hook structural surface 40 of a Velcro closure on the outer surface of the front panel 22 at a location proximate to the upper edge thereof. This hook structure is in the nature of a band along the upper edge of the front panel 22. The other surface having the structure of loops 42 is placed on the undersurface of the flap extension 32 of the top panel 20 in a band along that undersurface. Any one of the three separate fastening systems may be entirely unfastened independently of the others, and the unfastening of any one provides access into the main compartment 12 without unfastening either of the other two. For example, unfastening either of the vertical zippers 36 or 38 (without unfastening the other vertical zipper and without unfastening the perpendicular pressure secured fastening system 40 and 42) allows one to reach one's hand into the main compartment to insert or remove a small item, as desired. The panels bordering the unfastened zipper are sufficiently pliable to permit this.

Significantly, the three fastening systems can be closed exceedingly fast. A quick slide closes each zipper 36, 38, and quick lowering of the top 20 with a fast brush of one's hand over the flap extension 32 to interlock it on the upper edge of the front panel 22 closes the top of the luggage. Flaps 47 and 48 from the upper edges of end panels 26 and 28 protect those ends of the main compartment.

Figure 4:
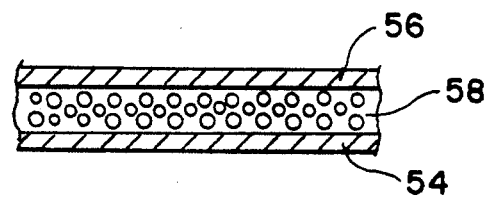
FIG. 4 is a fragmentary schematic cross section of a panel structure for the luggage.

Ideally, the bottom panel 18 and both end panels 26 and 28 are formed from a continuous strip of material, whether the material is a single layer of material or, as preferred, a plurality of layers. The preferred plurality of layers (see FIG. 4) comprises an inner pliable sheet material 54, an outer pliable sheet material 56, and a compressible padding 58 therebetween. The inner and outer layers may be formed of natural or synthetic materials, leather, plastic, cloth, etc. Ideally, cloth is employed, and Cordura cloth (a light canvas-like cloth) is highly preferred. Compressible padding of almost any suitable character may be employed, with thin foamed elastomeric material being preferred. Quilting, however, may be employed, and indeed the several layers of the panels may be quilted together as by sewing, if desired.

Figure 5:
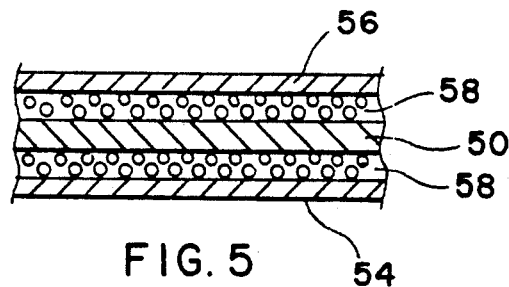
FIG. 5 is a fragmentary schematic cross section of a preferred panel structure for one or both the bottom panel and top pane of the luggage.

At least one and preferably both the bottom 18 and top 20 panels have a stiffening sheet-like member 50 embedded in or included as a part thereof, and this structure for a panel is illustrated in FIG. 5. The purpose of stiffening member 50 is not to totally destroy pliability for those panels, but to impart some structural strength to them. A stiffening member effects a reduction of the pliability of the panel as compared to the pliability of all the other panels lacking such stiffening member. By inserting a thin (e.g., from as little as a fraction of a millimeter thick up to about possibly 3 or 4 or even 5 mm thick) sheet of plastic such as polyethylene between the outer 56 and inner 54 layers of sheet material forming the top 20 and bottom 18 panels, sufficient stiffness is imparted to those panels to cause them to maintain the elongated luggage structure in a more or less defined rectangular parallelepiped shape, despite the greater pliability of other panels. Padding 58 on each side of the stiffener (as illustrated in FIG. 5) contributes to softness for the top and bottom panels. Stiffening is important to permit one to achieve a composite pet luggage possessing softness and over all pliability for the comfort of the person carrying it, and yet maintain internal compartment organization without extraordinary or undue sagging of the elongated luggage. As will be discussed below, the arrangement of elements within the main compartment is such that weight distribution is easily accomplished for convenience and comfort in handling the luggage.

Essential to the person competing in pet shows and important to any pet enthusiast, and a useful item for the hunter for cleaning hunting dogs, is a towel (such as one of terry cloth or any suitable cleaning or wiping cloth).

The invention includes a towel holder 60 on the interior surface of the front panel. This towel holder 60 is formed of a length of pliable material such as cloth, for example, Cordura cloth. The length of pliable material 60 (e.g., drapeable material) is fixed or anchored at one end 62 (as by sewing) to the interior surface of the front panel and is free at the other end 64. The length has non-adhesive perpendicularly interlocking fastening surfaces (as discussed above and exemplified by Velcro) associated with it. Ideally, one structural surface of Velcro hooks 66 is proximate to the end of the pliable material 62 fixed o the interior of the front panel 22. This hook surface proximate to the fixed end may indeed be at the fixed end and even extend onto the adjacent surface of the front panel interior. The other end 64 of the pliable material has fixed on it proximate to its end, but on the opposite side of the length 60, a loop structure 68 of the Velcro type or style. Winding of the free end 64 of the length about a towel toward the fixed end 62 effects interlocking of the fastening surfaces on opposite sides of the length (at varying positions depending on towel thickness) to hold the rolled towel in a fixed position against the interior surface of the front panel. The perpendicular interlocking surfaces are on opposite sides of the length of material wound around the towel. While elasticized bands may be employed for towel holding, the preferred holder arrangement illustrated is far more ideal and versatile.

A further structure on the interior of the pivotable front panel 22 is a pocket 70. It is suitably formed of a pliable material such as afore-discussed and is equipped with a closure means 72 preferably of zipper character at its mouth. Non-adhesive perpendicular interlocking surfaces may be employed as the closure, if desired. The mouth of the pocket should be at its end facing the upper edge of the front panel 22. This pocket 70 is most ideally employed for holding grooming equipment items 73 (e.g., comb, brush, scissors, clippers, etc.), and the closure employed for it should hold the items against accidentally slipping out of the pocket as the pocket is shifted from vertical to horizontal location with the pivotable movement of the front panel from vertical to horizontal, and vice versa.

Another pliable pocket 74 is also preferably on the interior of the pivotable front panel, and equipped with a suitable closure means 76 such as a zipper at its mouth. The mouth opening faces the upper edge of the front panel 22. Pocket 74 is useful for holding a variety of items. Among others, grooming items 75 of liquid or powdery nature (e.g., shampoos, conditioners, sprays, etc.) preferably should be included in this pocket, and positioned with their tops facing toward the upper edge of the front panel 22. If desired, this pocket may be lined with flexible plastic film to form a barrier and thus save other portions of the luggage from being contaminated from a small spill of liquid or powdery grooming aids.

The outside pockets of the luggage, namely pockets 14 and 16, are fixed to the exterior surfaces of the end panels 26, 28 and not to the side panels such as the front 22 or back panel 24. This most ideal arrangement allows for either side 22, 24 of the elongated luggage to be positioned adjacent a person's body during the times of carrying the luggage, there being no need to orient the luggage to present only one available side of it next to the person carrying it. This unique arrangement of outside pockets—at the very ends of an already elongated luggage product—has a still further benefit in that the outside pockets may be stuffed and even be bulging without creating an obstacle to comfortable carrying of the luggage (a pocket on the sides of the luggage would interfere with the carrier's comfort). Most preferably, one outside pocket 14 is employed as the compartment for carrying items needed to maintain environmental sanitation such as a scoop or pooper scooper 77 for removing fecal matter from areas where it is unwanted, as well as disposable bags 78 for temporary placement of scooped up fecal matter in preparation for carrying it to dispose of it. The scoop 77 is preferably stored in pocket 14 inside a plastic bag or sleeve 79. A closure means 46 such as a zipper is provided to close the mouth of pocket 14. The other outside pocket 16 is ideally employed as a compartment for storing a leash 80 for use in walking a pet, and is closed as by a zipper 44. While the pocket 14 carrying equipment for scooping up and disposing of fecal matter normally will not be employed to carry any other item, the outside pocket 16 for the leash may indeed be employed for carrying small items of clothing or other elements or items for a pet, if desired. These outside pockets allow for quick access at roadside stops without disturbing other items in the luggage.

Figure 6:
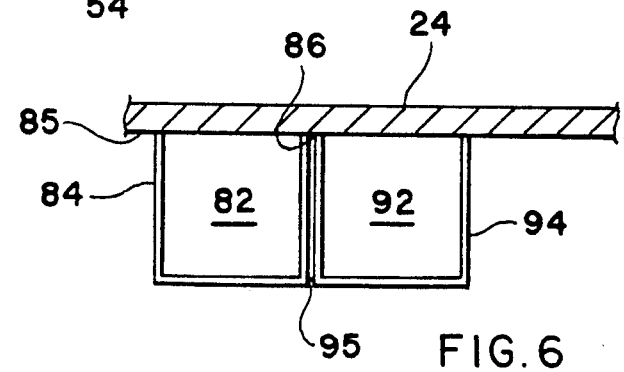
FIG. 6 is a schematic cross section on a horizontal plane through a portion of the back panel of the luggage and two containers and holders for the containers.

Along the interior of the back panel 24 in the main compartment is a line-up of container holders of a style most ideally employed for containers of the luggage. The first container 82 is preferably for water and is in a first holder 84 (see FIGS. 2 and 6). This first holder consists essentially of a band of material 84 (e.g., suitably a pliable material such as cloth) having its ends fixed in horizontally spaced relationship 85 and 86 (see FIG. 6) to one or more of the back and opposing end panels. Ideally, the ends 85 and 86 of the band are fixed to the back panel 24 by sewing to the inner layer of back panel 24. They are fixed in horizontally spaced relationship. This band 84 has an upper edge 87 and a lower edge 88 (see FIG. 2). A strip along or adjacent the upper edge is equipped with a stiffening means 89, which is bendable and retains its shape on bending. The stiffener for this structure is not resilient. It is shapeable and once shaped will retain the contours into which it is shaped. For example, a stiffening cardboard strip may be sewn along or within the upper edge and bent to hold that upper edge in a shape matching the horizontal perimeter shape (outside shape) of a first container 82. Container 82 is illustrated as substantially square in horizontal cross section. The shapeable stiffening 89 at the upper edge of the band or holder 84 tends to maintain the upper edge free of wrinkles or gathers (as common where elastic is used). Thus the upper edge is saved in position for replacing the first container in the band holder (in a relatively snug fit) without fumbling to get the container in the holder and without fumbling to pull the holder about the exterior of the container. Extraordinary convenience for insertion and removal of containers is therefore made possible. Another feature of this first holder or band 84 is that its lower edge 88 is in loose, unsecured relationship to the bottom panel. A strip of stiffening material of the same type as at the upper edge may be employed at the lower edge to assist in holding the shape at the lower edge. Of course, the entire band holder 84 may be equipped with a degree of conformable stiffening to maintain its shape in conformance to a first container 82 that is removed and replaced in that holder. Shapeable stiffeners of netting or other material than cardboard may be employed. The loose unsecured relationship of the bottom or lower edge of the holder 84 with respect to the bottom panel is important in allowing slight shifting of the holder as well as the container with respect to the bottom panel, without bunching or wrinkling of the holder band 84.

The second container 92 (preferably for treats) and a second holder band 94 are also provided at the interior of the main compartment. This second holder is comparable to the first holder in structure, and is mounted on the back panel 24 as described for the first holder. A further feature, however, is that this second holder 92 is fixed to the first holder 84 in such a manner that the second holder cannot shift away from the first holder. This feature is not critical but is desirable. The fixing of the second holder to the first holder is suitably done by a line of vertical sewing 95 (see FIGS. 2 and 6) that unites the two holders along that line.

Next in the line-up of holders and containers on the back panel is a pocket 96 having a gathered elasticized mouth edge for holding bowls 97 for pet food and water. A still further holder band 98 for holding another container 100 (e.g., for pet food) is provided at the other end of the back panel. The structure of the holder 98 is a band structure comparable to that described for the band holder 84. Containers 82 and 92 for water and treats (e.g., dog biscuits) may have about the half the volume of the container 100 for the pet food. For example, the holders for water and treats may be half-gallon size whereas the pet food may be gallon size. Each container should have a cover for providing a secure fluid-tight or air-tight seal. Plastic containers are ideal. The positioning of containers in the illustrated line-up makes for easy and complete access to all containers for quick action at meal times and also contributes to a reasonably balanced weight distribution for ease and comfort of carrying.

Figure 3:
FIG. 3 is a schematic representation of a temporary information or identification tag.

A substantially flat interior pocket 102 is provided on the interior of the back panel 24, or such a pocket 102a is on the interior of top panel 20. The flat pocket is for storing paper or other sheet-like documents, for example, veterinarian papers, vaccination tags or papers, identification materials, ownership materials, etc. A temporary identification sticker is illustrated in FIG. 3, and recites that owners can be reached at a particular phone number during a certain time period from one date to another. A supply of such temporary stickers for sticking on a pet's identification tag is preferably included in the flat pocket as the luggage is marketed as an article of manufacture. Closure means 104 for the flat interior pocket may comprise a simple zipper, although other closures for the pocket are suitable to employ.

A still further unique feature of the luggage is a plural recess medicine container 106 held within the main compartment of the luggage by elasticized straps 108 and 110 on the interior of the back panel. Optionally such a container 106a may be held by such straps or other means on the interior of the top panel 20. An ideal medicine container is one of plastic having seven individual recesses with individual covers for each. Such a container effectively functions as a seven-day medication reminder. Placement of the flat pocket next to the medicine container contributes to streamlined motions related to health and identification issues, and the placement on the interior of the top panel or cover tends to remove them from interference with the alimentary items in the holders on the back panel 24.

Among the optional features for the luggage are a hook or pocket for whistles, a first-aid kit for the pet (especially hunting dogs), and pockets or holders or elasticized bands for starting pistols, retrieving dummies, or any other specialized item for a particular pet.

The shoulder carrying strap 112 extends between and is mounted on the end panels 26 and 28 of the luggage. This shoulder strap is adjustable in length by means of a slidable buckle 113 and loop 114 arrangement. A hand carrying strap 115 is fixed on the outer surface of the front panel as illustrated, and a comparable hand carrying strap is fixed on the outer surface of the back panel, but not shown in the drawing. These hand carrying straps from the opposite sides of the luggage provide a convenient alternative to carrying the luggage on one's shoulder, and are especially useful when moving the luggage in and out of the trunk of a car.

There is thus provided a novel form of pet luggage having outside end pockets for quick access at roadside stops or other points of opportunity where walking of a pet is necessary for the pet's health. The outside pocket arrangement completely separates the pooper scooper and its associated items (such as disposable bags for handling the fecal material) from the rest of the contents carried by the pet luggage. The arrangement is believed to be the most hygienic arrangement possible. The outside leash pocket adds to the convenience of quick access and storage so as to permit the pet owner to quickly take advantage of walks for a pet at every practicable opportunity during travel.

Feeding and watering a pet also requires attention during travel and sometimes must be accomplished under limited conditions or rather short notice. The arrangement of the alimentary items in the main compartment make them accessible simply by lifting the cover, although one side zipper for the front panel may need to be partially lowered or even fully lowered to gain access to water and treat containers if the towel in the towel holder is sufficiently large to extend over the water and treat containers.

A pet lover equipped with the luggage of the invention can be comfortable in knowing that everything needed for a pet will be remembered when packing for the trip because the unique organization reminds the pet owner to collect everything to fill the particular compartments and pockets.

Those skilled in the art will readily recognize that this invention may be embodied in other specific forms than that illustrated without departing from its spirit or essential characteristics. The illustrated embodiment is therefore to be considered in all respects as illustrative and not restrictive. The scope of the invention is indicated by the appended claims rather than the foregoing description, and all variations that come within the meaning and range of equivalency of the claims are intended to be embraced thereby.

That which is claimed is:

1. Pet luggage for comfortably carrying equipment and supplies for a pet in a separated manner allowing for selected access to some items and protected storage of other items, comprising an elongated main storage compartment having a substantially rectangular parallelepiped shape and at least one outside pocket attached to said main compartment and accessible independently thereof, said main compartment being defined by pliable bottom, top, front, back, and opposing end panels and by a length between end panels greater than two and one-fourth times the width between said front and back panels, said top panel being pivotably attached to said back panel and having a flap extension along its front edge, said front panel being pivotably attached to said bottom panel, and said main compartment being further characterized by being protectively closed by three separate fastening systems, two of said fastening system consisting essentially of zipper assemblies which unzip vertically to said bottom panel, one said zipper assembly being between said front panel and one end panel, and the other said zipper assembly being between said front panel and the other end panel, said zipper assemblies being designed to allow, on unzipping to said bottom panel, a pivotable drop of the front panel of said main compartment from a vertical orientation to a horizontal orientation substantially in the same plane as the bottom panel of said compartment, the third separate fastening system consisting essentially of non-adhesive cooperatively interlocking structural surfaces formed of miniature elements which randomly interlock by mere perpendicular pressure of one structural surface against the other, one said structural surface being on the outer surface of said front panel proximate to the upper edge thereof and the other said structural surface being on the undersurface of said flap extension of said top panel, said third fastening system being unfastenable by forces applied perpendicular to the structural surfaces thereof and being substantially incapable of being unfastened by forces applied parallel to the structural surfaces thereof, any one of said three fastening systems being entirely unfastenable to provide access into said main compartment without unfastening either of the other two.

2. The pet luggage of claim 1 wherein one or both of said bottom and top panels comprises a stiffening means which relatively reduces the pliability of the panel as compared to the pliability of those panels lacking such stiffening means.

3. The pet luggage of claim 1 wherein said panels comprise inner and outer layers of pliable sheet material and a layer of compressible padding therebetween.

4. The pet luggage of claim 1 additionally comprising a towel holder mounted on the interior surface of said front panel.

5. The pet luggage of claim 4 wherein said towel holder comprises a length of pliable material fixed at one end to said interior surface of said front panel and free at the other end, said length of material having nonadhesive perpendicularly interlocking fastening surfaces proximate to the ends of said length and on opposite sides thereof such that winding the free end of said length about a rolled towel toward the fixed end of said length effects interlocking of the fastening surfaces on opposite sides of said length to hold said towel in a fixed position against the interior surface of said front panel.

6. The pet luggage of claim 1 additionally comprising a pocket formed of pliable material on the interior of said pivotable front panel, said pocket being equipped with a closure means for holding grooming items therein against accidentally slipping out of said pocket.

7. The pet luggage of claim 1 additionally comprising two pliable pockets on the interior of said pivotable front panel, each being equipped with closure means.

8. The pet luggage of claim 1 wherein said one outside pocket is fixed to the exterior surface of an end panel of said main compartment, thereby increasing the elongated character of said luggage.

9. The pet luggage of claim 1 additionally comprising a second outside pocket, each said outside pocket being fixed to the exterior surface of an end panel of said main compartment, one said outside pocket being for equipment for removing fecal matter from areas where it is unwanted and the other being for a leash for use in walking the pet.

10. The pet luggage of claim 1 having a first container and a first holder for said first container within the main compartment, said first holder consisting essentially of a band of material having its ends fixed in horizontally spaced relationship to one or more of the panels consisting of said back and opposing end panels, said band having an upper edge and a lower edge, at least a strip of said band adjacent said upper edge comprising a stiffening means for maintaining said band in a shape matching the horizontal perimeter shape of said first container, the lower edge of said band being in loose unsecured relationship to said bottom panel.

11. The pet luggage of claim 8 having a second container and a second holder for said second container, said second holder being adjacent said first holder and being fixed to said first holder such that said second holder is not shiftable away from said first holder.

12. The pet luggage of claim 1 additionally comprising a pocket having an elasticized mouth edge for holding bowls for pet food or water.

13. The pet luggage of claim 1 having a line-up of container holders on the back panel for accommodating and holding two containers for water and treats at one end of the back panel and a container for pet food at the other end of the back panel, with a pocket for bowls for food and water therebetween.

14. The pet luggage of claim 1 additionally including a substantially flat interior pocket on a back or end or top panel of said main compartment, said flat interior pocket being for the storage of paper or other sheet-like documents, and closure means for said flat interior pocket.

15. The pet luggage of claim 1 equipped with a plural-recess medicine container within the main compartment, and means for holding said medicine container at a specific location on an interior surface of said main compartment.

16. The pet luggage of claim 1 additionally comprising a shoulder carrying strap extending between and mounted on said end panels of said main compartment.

17. Pet luggage for comfortably carrying equipment and supplies for a pet in a separated manner allowing for selected access to some items and protected storage of other items, comprising an elongated main storage compartment having a substantially rectangular parallelepiped shape and at least one outside pocket attached to said main compartment and accessible independently thereof, said main compartment being defined by pliable bottom, top, front, back and opposing end panels, said top panel being pivotably attached to said back panel and having a flap extension along its front edge, said front panel being pivotably attached to said bottom panel, and said main compartment being further characterized by being protectively closed by three separate fastening systems, two of said fastening systems consisting essentially of zipper assemblies which unzip vertically to said bottom panel, one said zipper assembly being between said front panel and one end panel, and the other said zipper assembly being between said front panel and the other end panel, said zipper assemblies being designed to allow, on unzipping to said bottom panel, a pivotable drop of the front panel of said main compartment from a vertical orientation to a horizontal orientation substantially in the same plane as the bottom panel of said compartment, the third separate fastening system consisting essentially of non-adhesive cooperatively interlocking structural surfaces formed of miniature elements which randomly interlock by mere perpendicular pressure of one structural surface against the other, one said structural surface being on the outer surface of said front panel proximate to the upper edge thereof and the other said structural surface being on the undersurface of said flap extension of said top panel, said third fastening system being unfastenable by forces applied perpendicular to the structural surfaces thereof and being substantially incapable of being unfastened by forces applied parallel to the structural surfaces thereof, any one of said three fastening systems being entirely unfastenable to provide access into said main compartment without unfastening either of the other two.

18. The pet luggage of claim 17 additionally comprising a pocket formed of pliable material on the interior of said main compartment.

19. The pet luggage of claim 17 having a first container and a first holder for said first container within the main compartment, said first holder consisting essentially of a band of material having its end fixed in horizontally spaced relationship to the interior of said main compartment.

20. The pet luggage of claim 17 additionally comprising a pocket having an elasticized mouth edge.

* * * * *